J. P. HUNTER.
Horse Rake.
No. 66,679.    Patented July 16, 1867.
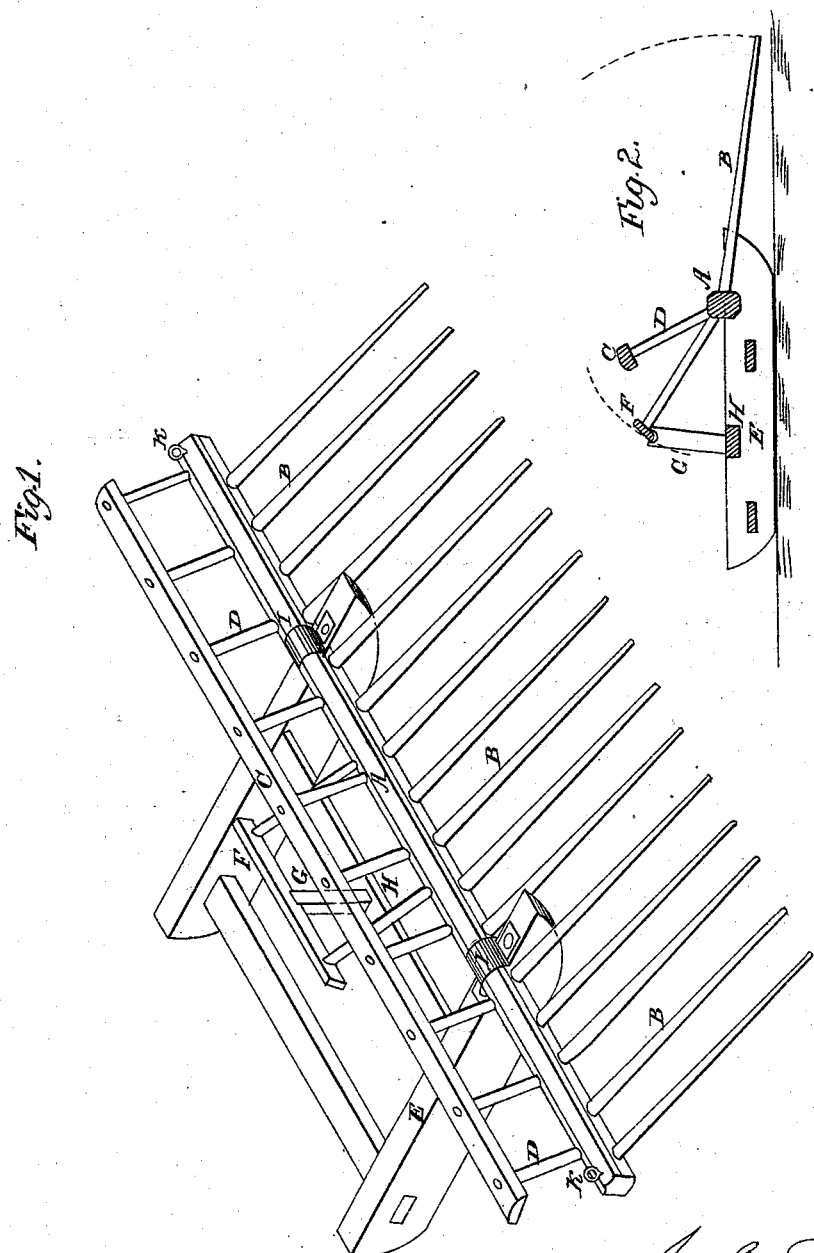
Witnesses:
Inventor:

United States Patent Office.

JOHN P. HUNTER, OF WILLIAMSPORT, INDIANA.

Letters Patent No. 66,679, dated July 16, 1867.

IMPROVEMENT IN HORSE-RAKES.

The Schedule referred to in these Letters Patent and making part of the same

TO ALL WHOM IT MAY CONCERN:

Be it known that I, JOHN P. HUNTER, of Williamsport, in the county of Warren, and State of Indiana, have invented a new and valuable Improvement in Horse Hay-Rakes; and I do declare the following is a full, clear, and exact description of the same, reference being had to the annexed drawings, making part of this specification, in which—

Figure 1 is a perspective view, and

Figure 2 is a vertical longitudinal section.

In both figures I employ the same letters in the indication of identical parts.

This rake is intended to be used for gathering the cut grass, as it is drawn by at least two horses across the meadow, and carrying it directly to the stack.

A is the rake-head, to which are attached the teeth B, projecting at a slight downward angle, which pass under and gather the cut grass which is collected, resting against a vertical or inclined framework formed by the beam C placed parallel to the head A, and connected therewith by braces D. E is a sled, formed of two runners turned up at both ends, and united by suitable braces. The rake-head A is carried upon one end of said sled, to which it is attached by straps I passing around rounded journals cut in the head. F is a handle attached to the rake-head and inclined backwards, the cross-piece thereof resting upon the upper end of the standard G, which is sustained upon the elastic spring-board H, crossing the sled and attached thereto. The elasticity of this spring-board is intended to maintain the teeth in their proper relation to the surface of the meadow, under variations in the level of the same.

The horses are intended to be attached to the head, at each end, by a rope fastened to the staples K. The horses may thus, by simply turning around, be made to draw the rake, following the sled when not at work, or in the direction of the projecting teeth when at work. When the load is drawn to the stack, the horses are turned to the opposite side, and the sled and rake following it drawn to the point from which the work of gathering is to be commenced.

What I claim as my invention, and desire to secure by Letters Patent, is—

In combination with the rake-head A and sled E, the handle F, standard G, and elastic spring-board H, substantially as and for the purpose set forth.

JOHN P. HUNTER.

Witnesses:
JAMES PARK,
SAM. T. MILLER.